(12) United States Patent
Takahashi et al.

(10) Patent No.: US 9,212,406 B2
(45) Date of Patent: Dec. 15, 2015

(54) VALUABLE METAL RECOVERY METHOD (75) Inventors: Jun-ichi Takahashi, Ehime (JP); Kazuhiro Mori, Ehime (JP); Toshirou Tan, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 268 days.

(21) Appl. No.: 13/985,690

(22) PCT Filed: Feb. 15, 2012

(86) PCT No.: PCT/JP2012/053491
§ 371 (c)(1),
(2), (4) Date: Nov. 22, 2013

(87) PCT Pub. No.: WO2012/111693
PCT Pub. Date: Aug. 23, 2012

(65) Prior Publication Data
US 2014/0069234 A1    Mar. 13, 2014

(30) Foreign Application Priority Data

Feb. 18, 2011  (JP) ................................. 2011-033378
Apr. 15, 2011  (JP) ................................. 2011-090728

(51) Int. Cl.
*C22B 7/00*        (2006.01)
*C22B 1/00*        (2006.01)
(Continued)

(52) U.S. Cl.
CPC ............... *C22B 7/001* (2013.01); *B09B 3/0083* (2013.01); *C22B 1/005* (2013.01); *C22B 1/02* (2013.01);
(Continued)

(58) Field of Classification Search
CPC .......... C22B 7/001; C22B 1/005; C22B 1/02; C22C 1/02; B09B 3/0083; H01M 10/54
See application file for complete search history.

(56) References Cited

U.S. PATENT DOCUMENTS 4,657,585 A * 4/1987 Yazawa et al. .................. 75/393
7,169,206 B2 * 1/2007 Cheret et al. ................. 75/10.19
(Continued)

FOREIGN PATENT DOCUMENTS

EP    1589121 A1    10/2005
JP    9-291317 A    11/1997
(Continued)

OTHER PUBLICATIONS

Office Action issued to CN Application No. 201280009299.6, mailed May 29, 2014.
(Continued)

*Primary Examiner* — George Wyszomierski
*Assistant Examiner* — Tima M McGuthry Banks
(74) *Attorney, Agent, or Firm* — Locke Lord LLP; Jeffrey D. Hsi (57) ABSTRACT

Provided is a method for improving the recovery rate of valuable metals such as cobalt when drying the battery waste of lithium ion batteries and the like. A second alloy excellent in terms of iron-cobalt separation performance and containing a small amount of iron is obtained by performing: a pre-oxidation step (ST20) for roasting and pre-oxidizing battery waste containing aluminum and iron; a melting step (ST21) for obtaining a molten product by melting the battery waste after the pre-oxidation step; a first slag separation step (ST22) for separating and recovering first slag containing aluminum oxide from the molten product; a second oxidation step (ST23) for oxidizing a molten first alloy after the first slag separation step; and a second slag separation step (ST24) for separating and recovering a second slag containing iron from a second alloy after the second oxidation step (ST23).

20 Claims, 3 Drawing Sheets (51) Int. Cl.
*C22B 1/02* (2006.01)
*C22C 1/02* (2006.01)
*B09B 3/00* (2006.01)
*H01M 10/54* (2006.01)
*H01M 10/0525* (2010.01)

(52) U.S. Cl.
CPC ................ *C22C 1/02* (2013.01); *H01M 10/54* (2013.01); *H01M 10/0525* (2013.01); *Y02W 30/54* (2015.05); *Y02W 30/84* (2015.05)

(56) References Cited

U.S. PATENT DOCUMENTS 8,840,702 B2 * 9/2014 Verscheure et al. ............ 75/626
8,951,331 B2 * 2/2015 Takahashi et al. .............. 75/414

FOREIGN PATENT DOCUMENTS

| | | |
|---|---|---|
| JP | 9-316678 A | 12/1997 |
| JP | 11-242967 A | 9/1999 |
| JP | 3563897 B2 * | 9/2004 |
| JP | 2005-42189 A | 2/2005 |
| JP | 2012-57238 A | 3/2012 |

OTHER PUBLICATIONS

International Search Report of PCT/JP2012/053491 dated May 1, 2012.

* cited by examiner

VALUABLE METAL RECOVERY METHOD

CROSS-REFERENCE TO RELATED APPLICATIONS

This application is the national phase under 35 U.S.C. §371 of PCT International Application No. PCT/JP2012/053491, filed Feb. 15, 2012, which claims the benefit of Japanese Patent Application No. 2011-090728, filed Apr. 15, 2011, and Japanese Patent Application No. 2011-033378, filed Feb. 18, 2011, the entire contents of the aforementioned applications are hereby incorporated herein by reference.

TECHNICAL FIELD

The invention relates to a method for efficiently recovering valuable metals from waste batteries, such as lithium-ion batteries.

BACKGROUND ART

Processes for recycling used or in-process defective batteries (hereinafter referred to as "waste batteries"), such as waste lithium-ion batteries, and recovering their valuable metals are broadly divided into dry and wet processes.

A dry process includes melting crushed waste batteries, separating valuable metals such as cobalt, nickel, and copper, which are to be recovered, from other less valuable metals and materials such as iron and aluminium by harnessing the difference in oxygen affinity between them, and recovering the valuable metals. Specifically, such a dry process includes oxidizing less valuable elements, such as iron, as much as possible to form slag and suppressing the oxidation of valuable materials, such as cobalt, as much as possible to recover the valuable materials in the form of an alloy.

For example, Patent Document 1 discloses a method using a high-temperature heating furnace, in which a flux is added to waste batteries, and slag is repeatedly treated so that valuable metals such as nickel and cobalt can be recovered at a rate of around 80%.

[Patent Document 1] U.S. Pat. No. 7,169,206

DISCLOSURE OF THE INVENTION

Problems to be Solved by the Invention

Iron and cobalt are elements having oxygen affinities close to each other. Thus, the oxidation reactions of both elements occur competitively. Therefore, it is theoretically impossible to oxidize and recover 100% of iron into slag and to recover 100% of cobalt into an alloy with no oxidation of cobalt at the same time. Practically, therefore, the metallic cobalt recovery rate is increased by controlling the degree of oxidation in such a manner that a certain part of iron is distributed into the alloy by reducing the degree of iron oxidation to below 100%. In other words, the cobalt recovery rate is increased by controlling the degree of oxidation in such a manner that a certain amount of iron is transferred into the alloy. The iron in the alloy is an unnecessary metal to be separated and removed in the later wet process. Thus, the content of iron in the alloy is preferably as low as possible.

The competitive oxidation reactions of iron and cobalt are influenced by other elements. Such other elements include aluminium, a large amount of which is contained as a cathode conductive material or the like in lithium-ion batteries. Aluminium, which has an oxygen affinity much higher than that of iron or cobalt, can easily form aluminium oxide. Thus, when aluminium is also present, aluminium preferentially consumes oxygen during the oxidation, so that a problem occurs, in which iron is oxidized insufficiently, and thus the content of iron in the alloy increases as the ratio of distribution of iron to the slag decreases.

In addition, if the content of aluminium oxide in the slag is relatively high, the slag will have relatively high melting temperature and relatively high viscosity. This causes a problem in that during the separation and recovery of the slag, the alloy is physically absorbed and transferred into the slag, so that the alloy recovery rate decreases.

Because of these causes, the iron content of the alloy required to obtain a predetermined cobalt recovery rate becomes higher in the presence of aluminium together with iron and cobalt than in the presence of only two elements: iron and cobalt. This makes it difficult to achieve a high distribution ratio of iron in the slag and a high distribution ratio of cobalt in the alloy at the same time in the process of treating waste lithium-ion batteries.

The invention has been accomplished to solve the above problems, and an object of the invention is to provide a valuable metal recovery method that makes it possible to stably and significantly increase the rate of recovery of valuable metals from waste batteries through a dry process.

Means for Solving the Problems

The inventors have drawn up the invention based on the finding that when slag separation is divided into two stages including first and second slag separation steps and when aluminium oxide-based first slag is separated in the first slag separation step and then iron oxide-based second slag is separated in the second slag separation step, the second slag formed in the second slag separation step is well separable from the alloy at a lower melting temperature, so that the performance of separation of cobalt from iron can be dramatically increased. More specifically, the invention provides the following.

(1) A method for recovering a valuable metal from a waste battery containing aluminium and iron, the method including: a melting step including melting the waste battery to form a melt; a first oxidation step including subjecting the melt during the melting step or the waste battery before the melting step to a treatment at a degree of oxidation that allows the aluminium to be oxidized; a first slag separation step including separating first slag containing aluminium oxide from the melt so that a first alloy containing iron is obtained; a second oxidation step including subjecting the first alloy or a melt of the first alloy to a treatment at a degree of oxidation that allows the iron to be oxidized; and a second slag separation step including separating second slag containing iron oxide from a melt after the second oxidation step so that a second alloy containing cobalt is recovered.

(2) The valuable metal recovery method according to item (1), wherein the ratio of the weight of iron in the first alloy to the total weight of iron in the waste battery is from 30% to 100%.

(3) The valuable metal recovery method according to item (1) or (2), wherein the ratio of the weight of cobalt in the second alloy to the total weight of cobalt in the waste battery is at least 75%, and the ratio of the weight of iron in the second alloy to the total weight of iron in the waste battery is from 7% to 30%.

(4) The valuable metal recovery method according to any one of items (1) to (3), wherein the first oxidation step is a pre-oxidation step including roasting the waste battery to perform a pre-oxidation treatment before the melting step.

(5) The valuable metal recovery method according to item (4), wherein the pre-oxidation step is performed at 600° C. to 1,250° C.

(6) The valuable metal recovery method according to any one of items (1) to (5), wherein the second slag separation step is performed at 1,350° C. to 1,550° C.

(7) The valuable metal recovery method according to any one of items (1) to (6), wherein the valuable metal recovery is performed a plurality of times, wherein the first round of the melting step includes forming a melt by melting a mixture obtained by adding a first flux to the waste battery, the second oxidation step includes treating a mixture obtained by adding a second flux to the first alloy or a melt of the mixture, and a second round and optional subsequent round of the melting step include adding, to the waste battery, the second slag as a flux instead of the first flux.

(8) The valuable metal recovery method according to item (7), wherein the second flux includes silicon dioxide ($SiO_2$) and lime (CaO) and has a weight ratio of $SiO_2$ to CaO of 0.5 to 1.5.

(9) The valuable metal recovery method according to item (7) or (8), wherein after the second round or optional subsequent round of the melting step, the first slag separation step, the second oxidation step, and the second slag separation step are performed to form the second alloy, the ratio of the weight of cobalt in the resulting second alloy to the total weight of cobalt in the waste battery is at least 75%, and the ratio of the weight of iron in the resulting second alloy to the total weight of iron in the waste battery is from 7% to 30%.

(10) The valuable metal recovery method according to any one of items (7) to (9), wherein the first round of the melting step is performed at 1,450° C. to 1,650° C., and the second round and optional subsequent round of the melting step are performed at 1,350° C. to 1,500° C.

(11) The valuable metal recovery method according to any one of items (7) to (10), wherein at least part of the first flux and/or the second flux includes slag produced in copper refining.

(12) The valuable metal recovery method according to any one of items (1) to (11), wherein the waste battery is a lithium-ion battery.

Effects of the Invention

According to the invention, the method for recovering a valuable metal, such as cobalt, from a waste battery containing aluminium and iron can include a pre-oxidation step and a dry step including a first slag separation step and a second slag separation step. In the pre-oxidation step, an oxidation treatment can be performed before a melting step. In the first slag separation step, aluminium oxide can be mainly separated from a melt. In the second slag separation step, iron can be mainly separated and removed from a first alloy from which aluminium oxide has been removed in the first slag separation step. Such a two-stage slag separation process makes it possible to significantly increase the performance of separation of valuable metals such as cobalt from slag of iron and other materials and also makes it possible to stably recover valuable metals at a high recovery rate.

EXPLANATION OF REFERENCE NUMERALS

ST10 Waste battery pretreatment step
ST20 Pre-oxidation step
S20 Dry step
ST21 Melting step
ST22 First slag separation step
ST23 Second oxidation step
ST24 Second slag separation step
ST25 Dephosphorylation step
ST26 Alloy shot-forming step
S30 Wet step
ST31 Dissolution step
ST32 Element separation step
1 Kiln
10 Kiln main body
11 Driving gear
12 Burner pipe
13 Feed inlet
14 Outlet

PREFERRED MODE FOR CARRYING OUT THE INVENTION

Figure 1:
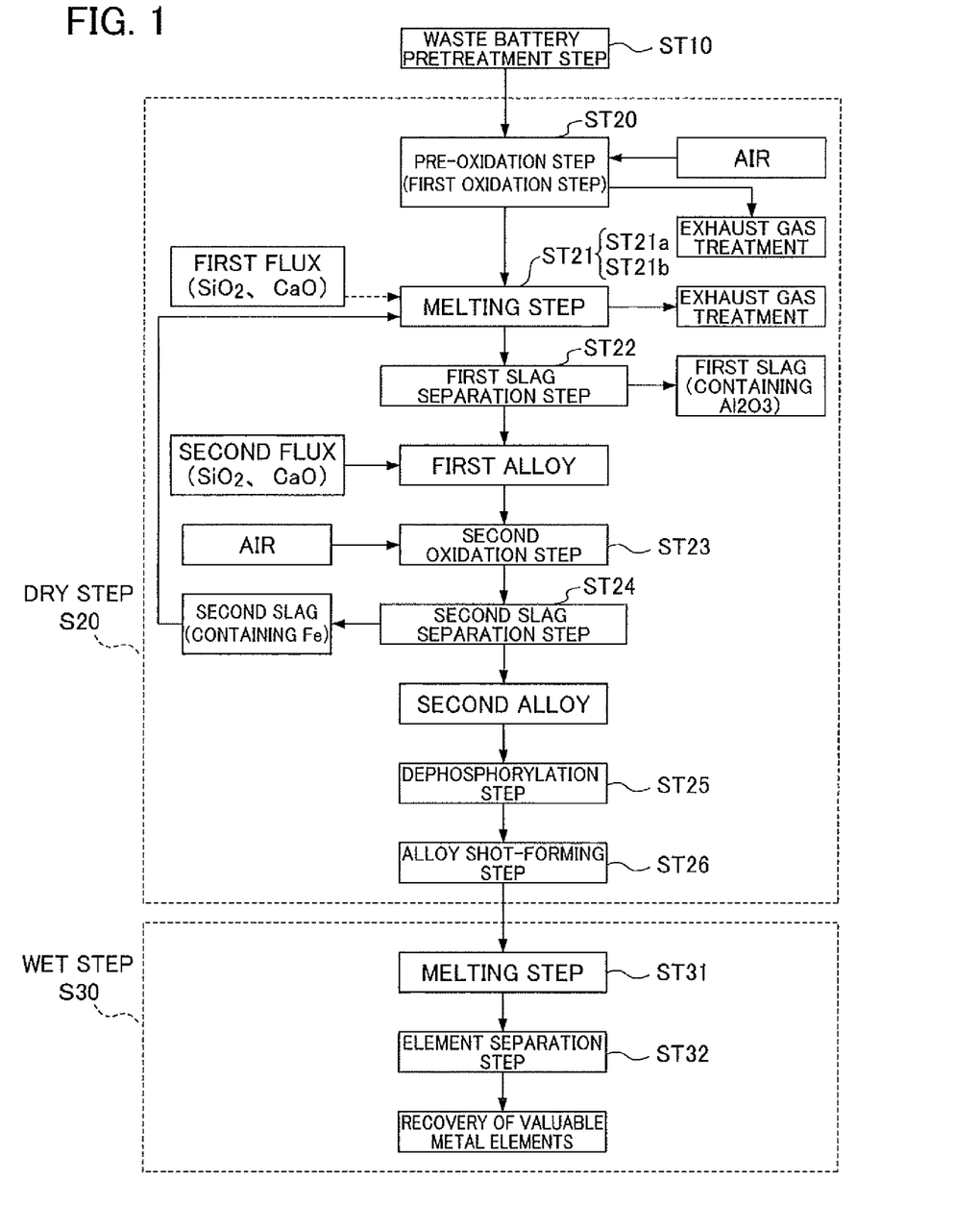
FIG. 1 is a flow chart showing an example of the invention, specifically, a method for recovering valuable metals from waste batteries.

Hereinafter, an embodiment of the invention will be described with reference to the drawings. FIG. 1 is a flow chart showing an example of a method for recovering valuable metals from waste batteries. In this embodiment, a case where the waste batteries are lithium-ion batteries is described, which, however, is not intended to be restrictive for the invention.

Whole Process

As shown in FIG. 1, this valuable metal recovery method includes a waste battery pretreatment step ST10, a pre-oxidation step ST20, a dry step S20, and a wet step S30. Thus, the valuable metal recovery method according to this embodiment is a total process including obtaining an alloy in the dry step S20 and then separating and recovering valuable metal elements using the wet step S30. As used herein, the term "waste battery" is intended to include not only a used battery but also others, such as in-process defect batteries. We also do not intend to exclude adding metal, resin, or any other material apart from waste batteries, as needed, as long as the object to be processed contains a waste battery. In such a case, metal, resin, or any other material is encompassed by the term "waste battery" in the invention.

Waste Battery Pretreatment Step ST10

The waste battery pretreatment step ST10 is performed to prevent waste batteries from exploding. Waste batteries are closed systems and contain an electrolytic solution or the like inside them. Thus, subjecting them to a dry melting process as they are involves a risk of explosion and is dangerous. Therefore, gas-venting holes need to be formed in some way.

The waste battery pretreatment step ST10 may be performed using any specific method. For example, holes may be mechanically formed in waste batteries using a needle-shaped cutting edge. In the invention, it is not necessary to separate or process individual parts because a melting step is performed in the later dry process.

Pre-Oxidation Step ST20 (First Oxidation Step)

The pre-oxidation step ST20 is a preferred mode of the first oxidation step according to the invention, which corresponds to the "first oxidation step including subjecting the melt during the melting step to a treatment at a degree of oxidation that allows the aluminium to be oxidized".

In the pre-oxidation step ST20, the pretreated waste batteries obtained in the waste battery pretreatment step ST10 are subjected to a pre-oxidation treatment by being roasted at a temperature of 600° C. to 1,250° C. with oxygen being supplied. In conventional valuable metal recovery methods, oxidation is performed in a melting step in a dry step. In contrast, the valuable metal recovery method of the invention includes the pre-oxidation step ST20 as the first oxidation step in which a pre-oxidation treatment is performed before the melting step ST21, so that valuable metal recovery can be performed in a more successful manner.

The pre-oxidation treatment is performed at a stage prior to the melting step ST21. The pre-oxidation treatment is performed in a pre-oxidation furnace provided separately from a melting furnace in which the melting step ST21 is performed. A kiln may be used as the pre-oxidation furnace. As an example, a rotary kiln, which is conventionally used in cement manufacture and so on, is preferably used. Hereinafter, therefore, the invention using a rotary kiln as a typical example of the kiln will be described in detail. It will be understood, however, that the kiln is not restricted to a rotary kiln in the invention. Any other kiln, such as a tunnel kiln (hearth furnace) may be used, and the term "kiln" is intended to include every type of kiln capable of performing the pre-oxidation step ST20, which includes roasting waste batteries while supplying oxygen so that the waste batteries can be oxidized in its inside.

Figure 2:
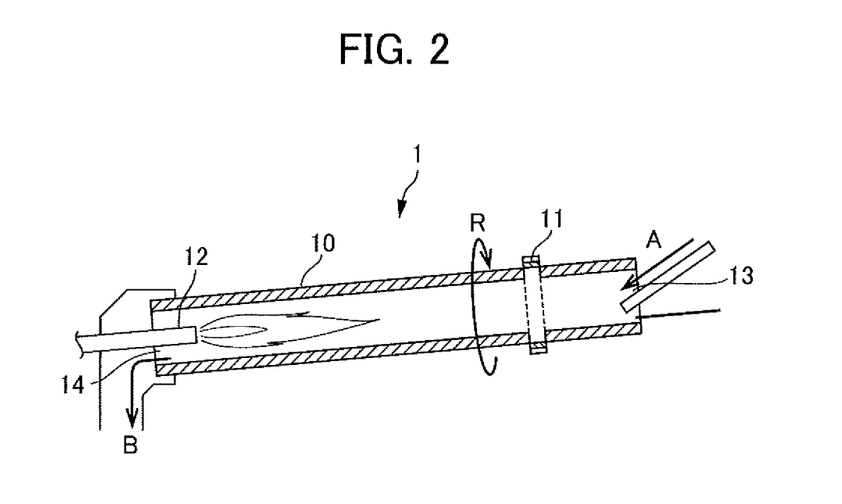
FIG. 2 is a schematic cross-sectional view showing how to use a kiln in an oxidation treatment during the pre-oxidation step according to the invention.

In this embodiment, the pre-oxidation step ST20 is performed using a kiln 1 shown in FIG. 2 as the pre-oxidation furnace. As shown in FIG. 2, the kiln has a main body 10, which is a cylindrical rotary kiln made of 15-30 mm carbon steel or the like. Its inside has a lining of firebricks or the like. The outside of the kiln main body 10 is provided with a driving gear 11 for transmitting a rotational force to the kiln main body 10. The inside of the kiln main body is provided with a burner pipe 12 that blows hot air to heat the inside. When used, the kiln main body 10 provided with these planes is set at an incline of 3 to 4% relative to the horizontal plane.

In the pre-oxidation step ST20 using the kiln 1, the inside of the kiln main body 10 is first heated to a temperature of 600 to 1,250° C. with hot air blown from the burner pipe 12. Waste batteries are then fed in the direction A through a feed inlet 13 while the kiln main body 10 is rotated in the direction R by means of the driving gear 11. The waste batteries move inside the kiln main body 10 toward an outlet 14 while they are agitated and roasted along the slant of the kiln main body 10. In this process, if the temperature inside the kiln main body 10 is less than 600° C., the oxidation of aluminium or carbon cannot proceed sufficiently, which is not preferred. When the temperature falls within the range of 600° C. to 1,250° C., the oxidation of aluminium and carbon proceeds sufficiently, but the oxidation of iron is kept at a relatively low level, so that only aluminium oxide can be successfully separated in the form of slag in the later first slag separation step. If the temperature exceeds 1,250° C., iron and other materials generally used in the outer shells of the waste batteries will partially adhere to the inner wall of the kiln main body 10, which may interfere with smooth operation or lead to degradation of the kiln itself and thus is not preferred.

A proper amount of an oxidizing agent (such as air) is introduced into the kiln main body 10 in order to control the degree of oxidation of the waste batteries, which move inside the kiln main body 10 while being roasted at a temperature of 600 to 1,250° C. as mentioned above. For example, foliated aluminium is used in the cathode materials of lithium-ion batteries. Carbon is also used in the anode materials. Batteries also have outer shells made of iron or aluminium, and plastics are used in outer packages of batteries. These materials basically act as reducing agents. Thus, the total reaction to convert these materials to gas and slag will be an oxidation reaction. Therefore, it is necessary to introduce oxygen into the kiln main body 10. Because of this, air is introduced in the pre-oxidation step ST20.

Although the oxidizing agent is not restricted, air, pure oxygen, oxygen-rich gas, or any other oxygen-containing gas is preferably used because it is easy to handle. In the pre-oxidation step ST20, the gas is directly supplied into the kiln main body 10. As a guide, the amount of the oxidizing agent to be introduced should be about 1.2 times the chemical equivalent required to oxidize each material to be subjected to the oxidation treatment.

The waste batteries oxidized through this process are discharged in the direction B from the outlet 14. The exhaust gas generated in the process of the oxidation treatment is discharged in the direction C.

In the pre-oxidation step ST20 according to the invention, the reaction rate is relatively low, because in this step, the oxidation treatment is performed at a temperature lower than the temperature at which an oxidation treatment would otherwise be performed in the melting step. In addition, the process of oxidizing the waste batteries moving inside the kiln main body 10 with a specific amount of oxygen being directly introduced into the space of the cylindrical kiln main body 10 makes it easy to control oxidation by controlling the amount of oxygen, the time and temperature of oxidation, or other factors. Thus, fluctuations in oxidation can be reduced, and the degree of oxidation can be more strictly controlled.

In the pre-oxidation step ST20, the degree of oxidation is controlled as described below. The oxidation of the main elements constituting the waste battery materials depends on the difference in affinity for oxygen, which generally follows the order: aluminium>lithium>carbon>manganese>phosphorus>iron>cobalt>nickel>copper. In other words, aluminium is the most vulnerable to oxidation, while copper is the most resistant to oxidation. In the pre-oxidation step ST20, first, the oxidation is allowed to proceed until the entire amount of aluminium is oxidized. At this stage, the oxidation may be further allowed to proceed until part of the iron is oxidized, but the degree of oxidation must be kept at such a level that cobalt is not recovered in the form of slag through oxidation. In the invention, this is meant by the term "a treatment at a degree of oxidation that allows aluminium to be oxidized." As mentioned above, the pre-oxidation step ST20 makes it possible to achieve such strict control of the degree of oxidation by controlling the amount of oxygen, the time and temperature of the oxidation, or other factors. When the degree of oxidation is controlled in such a manner, almost the whole amount of aluminium oxide can be separated in the form of slag in the first slag separation step ST22.

In the invention, the first oxidation step is not restricted to the pre-oxidation step based on roasting. Alternatively, similarly to the second oxidation step ST23 described below, the first oxidation step may be performed in the melting step ST21 by bubbling an oxidizing agent such as air into the melt through a lance, which is inserted into the melt. In the invention, this technique corresponds to the "first oxidation step including subjecting the waste battery before the melting step to a treatment at a degree of oxidation that allows the aluminium to be oxidized."

Melting Step ST21

In the dry step S20, the waste batteries pre-oxidized in the pre-oxidation step ST20 are first subjected to the melting step ST21, which includes melting the pre-oxidized waste batteries at a temperature of 1,450° C. or higher, preferably 1,650° C. or lower to form a melt of the waste batteries. The melting step ST21 can be performed in a conventionally known electric furnace or the like. The melt produced by the melting step ST21 contains a first slag-forming component containing oxides of aluminium and other materials; and a first alloy-forming component containing valuable metals, such as nickel, cobalt, and copper, and non-valuable metals, such as iron. When the pre-oxidation step ST20 is performed, no oxidation treatment is performed in this step.

In the melting step ST21, $SiO_2$ (silicon dioxide) and CaO (lime) or other materials are added as fluxes to the melt of the waste batteries. In this step, the $SiO_2$/CaO ratio is preferably between 0.5 and 1.5, more preferably between 0.8 and 1.1. This makes it possible to lower the melting temperature of the first slag to be separated in the first slag separation step ST22 described below. The flux does not always have to be added in the melting step ST21, and may be added in the pre-oxidation step ST20 before the melting step ST21 so that the same effect can be obtained. Dust, exhaust gas, and other exhaust products in the melting step ST21 are processed to be harmless in a conventionally known exhaust gas treatment.

In the invention, the valuable metal recovery procedure may be performed a plurality of times. In such a process, a first round of melting step and a second round and optional subsequent round of melting steps may be performed. As described in detail below, the flux added in the first round of melting step preferably differs in composition from that added in the second round and optional subsequent round of melting steps. In that case, the preferred melting temperature in the first round of melting step also differs from that in the second round and optional subsequent round of melting steps. Hereinafter, the description of the melting step ST21 will be divided, as needed, into two parts: the description of the first round of melting step ST21a and the description of the second round and optional subsequent round of melting steps ST21b.

The first round of melting step ST21a is performed at a temperature of 1,450° C. or higher, preferably 1,650° C. or lower. The second round and optional subsequent round of melting steps ST21b are performed at a temperature of 1,350° C. or higher, preferably 1,500° C. or lower. In all cases, the melting step ST21 can be performed in a conventionally known electric furnace or the like. The melt produced by the melting step ST21 contains a first slag-forming component containing oxides of aluminium and other materials; and a first alloy-forming component containing valuable metals, such as nickel, cobalt, and copper, and non-valuable metals, such as iron. When the pre-oxidation step ST20 is performed, no oxidation treatment is performed in this step.

In the first round of melting step ST21a, $SiO_2$ (silicon dioxide) and CaO (lime) or other materials are preferably added as a first flux to the melt of waste batteries. In the invention, the first flux refers to a flux that is added to waste batteries or a melt of waste batteries for the purpose of lowering the melting point of the first slag in the first round of melting step ST21a or in the pre-oxidation step ST20 before the first round of melting step ST21a. The first flux preferably has a $SiO_2$/CaO ratio of 0.5 to 1.5, more preferably 0.8 to 1.1, even more preferably 1.

Empirically, slag with a higher aluminium oxide ($Al_2O_3$) content has a higher melting temperature. To separate and recover such slag efficiently, it is necessary to raise the temperature of the slag to near its melting temperature so that its viscosity can be lowered enough. However, the higher melting temperature is not preferred because it can increase the energy cost, the rate of melting-induced damage to refractory materials, or the like, so that the operating cost can significantly increase. In particular, if the melting temperature exceeds 1,650° C., operation using a common electric furnace can be difficult to perform, and the parallel use of a plasma treatment as described in Patent Document 1 can also be necessary, so that the durability of refractory materials can decrease and the thermocouple for measuring the internal temperature of the furnace may also be damaged. Thus, in view of performing the melting step ST21 in a conventionally known electric furnace and in view of the melting temperature of the alloy to be produced, the slag preferably has a melting temperature of 1,450° C. to 1,650° C.

Although the first slag has a relatively high aluminium oxide content, the addition of the first flux in the melting step ST21a lowers the melting temperature of the first slag so that it has sufficiently low viscosity. Thus, even when the first round of melting step ST21a is performed at a temperature of 1,650° C. or lower, the first slag and the first alloy can be separated without problem.

The first flux does not always have to be added in the first round of melting step ST21a, and may be added in the pre-oxidation step ST20 before the first round of melting step ST21a so that the same effect can be obtained. In the pre-oxidation step ST20, the flux should be added after the waste batteries are crushed. In the melting step ST21, however, the flux can be added to the melt, which is more advantageous from two aspects: first, crushing cost can be saved; second, the retained quantity of heat can be used efficiently. Thus, the addition in the melting step ST21a is more preferred. Dust, exhaust gas, and other exhaust products in the first round of melting step ST21a are processed to be harmless in a conventionally known exhaust gas treatment.

In the second round and optional subsequent round of melting steps ST21b, the second slag is preferably added as a flux in place of the first flux, in which the second slag is separated and discharged in the second slag separation step described in detail below.

The second slag, preferably added as a flux, has an iron (iron oxide) content of 20% by weight or more. The iron contained in the flux is effective in lowering the melting temperature and viscosity of aluminium oxide-containing slag, such as the first slag. This is because when the slag also contains iron, not only the amount of alumina can be relatively reduced, but also iron ions can function as cations to break the alumina network in the slag, so that the iron can assist the improvement of the fluidization of the slag and reduce the melting temperature of the slag.

When the second slag containing iron is added as a flux in the second round and optional subsequent round of melting steps ST21b, the melting temperature of the first slag can be lowered to 1,500° C. or less, which is even lower than the melting temperature in the first round of melting step ST21a. This reduction in melting temperature can further reduce the energy. In addition, the melting range become wider at the same temperature, so that the slag composition range can be widened, which makes operation easy. In addition, the reuse of the slag, which would otherwise be discarded in conventional processes, can reduce the amount of the flux used at the same time and reduce the amount of the slag discharged to the outside of the system.

As in the case of the addition of the first flux, the addition of the second slag as a flux may be performed in the preceding pre-oxidation step ST20 so that the same effect can be obtained. In the second round of melting step ST21b, the same procedure as in the first round of melting step ST21a is performed again, except that the flux added in the second round of melting step ST21b is different from that in the first round of melting step ST21a.

First Slag Separation Step ST22

In the first slag separation step ST22, the first slag and the first alloy are separated and recovered, respectively, based on the difference in specific gravity between them.

In the first round of melting step ST21a, the addition of the first flux can lower the melting temperature and viscosity of the first slag. In addition, the addition of the iron-containing second slag in the second round of melting step ST21b can further lower the melting temperature. Thus, even when the melting step ST21 is repeated at the temperature mentioned above, the first slag and the first alloy can be separated without problem in the first slag separation step ST22.

In the first slag separation step ST22, aluminium is removed in the form of aluminium oxide to the slag, so that the distribution ratio of aluminium in the first alloy is extremely low. Specifically, the weight ratio of the amount of aluminium in the first alloy to the total amount of aluminium in the waste batteries is from 0% by weight to 0.1% by weight. Almost the whole amount of aluminium oxide, which would otherwise increase the melting temperature or viscosity of the slag, is distributed to the first slag in the first slag separation step ST22 and discharged outside the furnace.

This makes it possible to significantly increase the performance of separation of cobalt from iron in the later second slag separation step. In this case, the content (distribution ratio) of iron in the first alloy is preferably high, and the ratio of the weight of iron in the first alloy to the total weight of iron in the waste batteries is preferably from 30% to 100%. If the distribution ratio of iron is less than 30%, iron will be excessively distributed in the slag, and cobalt will also be partially distributed in the first slag, so that the cobalt recovery rate may undesirably decrease.

Second Oxidation Step ST23

Subsequently, the first alloy is subjected to an oxidation treatment in the second oxidation step ST23. This oxidation treatment can be performed by bubbling oxygen into the melt through straw-like cylinders made of an iron-based material, called lances, which are inserted into the melt. In this step, the melt may be a melt of the first alloy itself, obtained in the first slag separation step ST22, or may be a melt obtained by temporarily cooling the melt and then melting the product again. This second oxidation step ST23 produces second slag, which includes oxides of iron and other materials, and also produces a second alloy containing valuable metals, such as nickel, cobalt, and copper.

In the second oxidation step ST23, $SiO_2$ (silicon dioxide) and CaO (lime) or other materials are added as a second flux. In the invention, the second flux refers to a flux that is added to the first alloy obtained through the first slag separation step ST22 or to a melt of the first alloy for the purpose of achieving a high distribution ratio of iron in the slag and a high remaining ratio of cobalt in the alloy in the second slag separation step ST24.

A preferred mode of the valuable metal recovery method of the invention also includes using the second slag as an alternative to the first flux in the second round and optional subsequent round of melting steps ST21b, in which the second slag is produced in the second slag separation step ST24. The second flux is added for the above purpose in the second slag separation step ST24. Whether the purpose can be achieved does not significantly depend on the composition of the second flux. Thus, the second slag may be controlled to have a composition suitable for the use as a flux in the second round and optional subsequent round of melting steps ST21b, so that the resulting second slag can be suitable for reuse as the second flux. Thus, the composition of the second flux preferably has a $SiO_2$/CaO ratio of 0.5 to 1.5, more preferably 0.8 to 1.1, even more preferably 1.

Slag produced in copper refining may also be used as part of the first flux and/or the second flux. Slag produced in copper refining has a relatively high iron content and thus can be used as the first flux or as a component of the second slag to be reused, so that the viscosity of the first slag containing aluminium oxide can be lowered.

Second Slag Separation Step ST24

In the second slag separation step ST24, the second slag and the second alloy are separated and recovered, respectively, from the oxidized first alloy based on the difference in specific gravity between them. The second slag is temporarily discharged to the outside of the furnace so that it can be reused as the flux in the second round and optional subsequent round of melting steps ST21b. The second alloy is subsequently subjected to the dephosphorylation step ST25 and the alloy shot-forming step ST26.

In this step, the oxidized first alloy has a melting point of about 1,350° C. In the invention, aluminium oxide, which would otherwise raise the melting temperature and viscosity of slag, is separated and removed in the first slag separation step ST22, which can assist the improvement of the fluidization of the second slag in the second slag separation step ST24 and lower the melting temperature of the second slag to about 1,250° C., which is below the melting temperature of the first alloy. As a result, the performance of the physical separation of the second alloy can be increased by a reduction in viscosity, so that the valuable metal recovery rate can be increased. Thus, it is enough to set the temperature of the melt in the second slag separation step ST24 from about 1,350° C. to about 1,550° C.

In the first slag separation step ST22, aluminium is removed to the slag in the form of aluminium oxide. As a result, the distribution ratio of cobalt can be increased even when the distribution ratio of iron in the second alloy is relatively low with respect to the distribution ratio of aluminium and iron in each of the second alloy, the first slag, and the second slag. In other words, the performance of separation of cobalt from iron into the second alloy is significantly increased.

Specifically, if the ratio (weight ratio) of the weight of iron distributed in the second alloy to the total weight of iron in the waste batteries is at least 7%, the ratio (weight ratio) of the weight of cobalt distributed in the same second alloy to the total weight of cobalt in the waste batteries may be at least 75%. This means that even when the iron distribution ratio is as low as about 7%, a cobalt recovery rate of at least 75% can be achieved. Thus, the cobalt recovery rate can be increased even when the distribution ratio of iron in the alloy is significantly reduced as compared with a conventional case where aluminium oxide is also present at the slag separation stage.

Dephosphorylation Step ST25

The second slag separation step ST24 is followed by the dephosphorylation step ST25, which is performed on the second alloy to remove phosphorous from the second alloy. In lithium-ion batteries, ethylene carbonate, diethyl carbonate, or other organic solvents are used, and $LiPF_6$ (lithium hexafluorophosphate) or other electrolytes are used. The phosphorus in $LiPF_6$ tends to be relatively easily oxidized, but also tends to have a relatively high affinity for iron group elements such as iron, cobalt, and nickel. Phosphorus in the alloy is difficult to remove by the wet step, which is a later step for recovering each element in the form of metal from the alloy obtained in the dry process, and phosphorus is also accumulated as an impurity in the treatment system, which makes it difficult to continue the process. This can be prevented by removing phosphorus in advance in the dephosphorylation step ST25.

More specifically, lime or other materials capable of reacting to produce CaO are added, and oxygen-containing gas such as air is blown in so that phosphorus in the alloy can be oxidized and absorbed into the CaO. When the waste batteries are lithium-ion batteries, the alloy obtained through the dephosphorylation step ST25 contains, as components, cobalt or nickel derived from the cathode materials, lithium derived from electrolytes, and copper derived from the anode conductive materials, etc.

Alloy Shot-Forming Step ST26

At the end of the dry step S20, the alloy shot-forming step ST26 is performed. In this step, the alloy obtained through the dephosphorylation step ST25 is formed into grains (also referred to as "shot-shaped alloy" or simply "shots") by cooling it.

As described below, when the dry step is performed as a pretreatment in a wide sense, an alloy with fewer impurities can be obtained, and the amount of the material to be introduced into and treated in the wet step can be significantly reduced, so that a combination of the dry step and the wet step can work effectively. However, the wet step is a complicated process and basically unsuitable for high-throughput procedures. Thus, to use the wet step in combination with the dry step, the processing time of the wet step needs to be short, and in particular, the dissolution step ST31 needs to be performed in a short period of time. This problem can be solved by forming the alloy into grains so that the dissolution time can be reduced.

In this step, the grain preferably has an average surface area in the range of 1 $mm^2$ to 300 $mm^2$ and an average weight in the range of 0.4 mg to 2.2 g. If the surface area or the weight is less than the lower limit of the range, a problem may occur in which the particles are too small and thus difficult to handle and a reaction occurs too rapidly so that it will be difficult to dissolve the particles at a time due to too much heat generation, which is not preferred. If the surface area or the weight is more than the upper limit of the range, the rate of dissolution in the later wet step can undesirably decrease. The alloy can be made in the form of shots or formed into grains using a conventionally known method of pouring the molten metal into running water to rapidly cool it.

Wet Step S30

In a process of recovering valuable metals from waste batteries, the alloy recovered as described in Patent Document 1 is not valuable, and thus valuable metal elements must be recovered. When waste batteries are pretreated by the dry step so that an alloy of only valuable metals is obtained as described above, the later wet step can be simplified. In this case, the throughput of the wet step can be reduced to about ¼ to ⅓ (weight ratio) of the amount of the input waste batteries. This also makes the use of the wet step in combination advantageous.

Using the dry step as a pretreatment in a wide sense as described above makes it possible to obtain an alloy with fewer impurities and to significantly reduce the throughput. Thus, the invention makes possible a combination of the dry step and the wet step on an industrial scale.

The wet step is not restricted and may be performed using a conventionally known method. An example of the wet step is as follows. When the waste batteries are lithium-ion batteries and specifically when an alloy of cobalt, nickel, copper, and iron is produced, the alloy is subjected to dissolution with acid (the dissolution step ST31), and then an element separation step ST32 is performed, in which deironization, separation and recovery of copper, nickel/cobalt separation, recovery of nickel, and recovery of cobalt are conducted in this order, so that valuable metal elements are successfully recovered.

The waste batteries may be of any type. Preferred examples of the object to be processed according the invention are lithium-ion batteries, from which rare metals such as cobalt and nickel can be recovered, and whose applications expand to include automobile batteries and others, so that large-scale recovery processes will be necessary for them.

EXAMPLES

Hereinafter, the invention will be more specifically described with reference to the example below, which, however, is not intended to limit the invention.

In the example, a first round of process was performed as shown in FIG. 1. In the first round of process, a pre-oxidation treatment was performed in a pre-oxidation step (first oxidation step) before a melting step. A melting treatment was then performed in a melting step, and then first slag separation, an oxidation treatment, and second slag separation were performed to recover valuable metals. Subsequently, a second round of process was performed. In the melting step of the second round of process, the second slag obtained in the first round of process was reused as a flux when valuable metals were recovered.

First Round of Process

An alumina crucible containing about 25 g of a waste lithium-ion battery (hereinafter referred to as the "sample") and 7.3 g of a flux mixture with a $SiO_2$/CaO ratio of 1 was placed in an electric furnace with a nitrogen atmosphere, and subjected to the pre-oxidation step in which 0.1 L/minute of oxygen was blown into the crucible through an alumina tube while the sample was held at a temperature of 1,100° C. for 30 minutes so that the oxidation was facilitated until the whole amount of aluminium was oxidized.

After the pre-oxidation step, the oxidized sample in the crucible was subjected to the melting step in which the sample was molten at a temperature of 1,500° C. by heating in a nitrogen atmosphere and then by being held at this temperature for 30 minutes.

After holding the temperature for this time, the sample was cooled in the furnace. After the cooling, the sample was subjected to a first slag separation step in which first slag and first alloy were separated and recovered, respectively, from the sample based on the difference in specific gravity between them.

Subsequently, the first alloy separated and recovered in the first slag separation step and 5.0 g of a flux mixture with a $SiO_2$/CaO ratio of 1 were placed again in the alumina crucible and subjected to a second oxidation step while they were molten at a temperature of 1,500° C. and held at this temperature for 30 minutes. The second oxidation step was performed by bubbling 0.1 L/minute of oxygen into the melt through a straw-like cylinder made of an iron-based material, called a lance, which was inserted into the melt.

The first alloy obtained through the oxidation treatment in the second oxidation step was cooled in the furnace. After the cooling, the first alloy was subjected to second slag separation in which second slag and second alloy were separated and recovered, respectively, based on the difference in specific gravity between them. The second slag and the second alloy recovered were each crushed into grains of at most 5 mm in diameter using a hammer. With respect to the second alloy obtained through the second slag separation, the crushed second alloy was dissolved in aqua regia and then subjected to analysis using the ICP method to determine the distribution ratios of metallic iron and metallic cobalt in the first round of process.

Second Round of Process

In the second round of process, the second slag obtained in the first round of process was reused as the first flux, and the melting step was performed at a lower melting temperature to recover valuable metals. Except for these points, the second round of process was performed under the same conditions as those in the first round of process.

An alumina crucible containing about 25 g of a waste lithium-ion battery (sample) was placed in an electric furnace with a nitrogen atmosphere, and subjected to the pre-oxidation step in which 0.1 L/minute of oxygen was blown into the crucible through an alumina tube while the sample was held at a temperature of 1,100° C. for 30 minutes so that the oxidation was facilitated until the whole amount of aluminium was oxidized.

After the pre-oxidation step, the second slag recovered and crushed in the first round of process was added into the alumina crucible. The oxidized sample and the second slag were subjected to a melting step in which they were molten at a temperature of 1,400° C., which was slightly lower than that in the first round of process, and held at this temperature for 30 minutes.

After holding the temperature, the product was cooled in the furnace. After the cooling, the first slag separation step was performed, in which first slag and first alloy were separated and recovered, respectively, from the sample based on the difference in specific gravity between them.

Subsequently, the first alloy separated and recovered in the first slag separation step and 5.0 g of a flux mixture with a $SiO_2/CaO$ ratio of 1 were placed again in the alumina crucible and subjected to the second oxidation step while they were molten at a temperature of 1,450° C., which was slightly lower than that in the first round of process, and held at this temperature for 30 minutes. The second oxidation step was performed by bubbling 0.1 L/minute of oxygen in the same way as in the first round of process.

The first alloy obtained through the oxidation treatment in the second oxidation step was cooled in the furnace. After the cooling, the first alloy was subjected to the second slag separation step in which second slag and second alloy were separated and recovered, respectively, based on the difference in specific gravity between them. The second slag recovered was crushed into grains of at most 5 mm in diameter using a hammer. With respect to the second alloy obtained through the second slag separation step, the crushed second alloy was dissolved in aqua regia and then subjected to analysis using the ICP method to determine the distribution ratios of metallic iron and metallic cobalt in the second round of process.

Next, a comparative example will be described. In the comparative example, the melting step was performed with no pre-oxidation treatment, and the oxidation step and the slag separation step were each performed only once without being divided into two sub-steps. The melting and oxidation treatments were performed under the conditions described below. The other conditions were the same as those in the example.

In the melting step, an alumina crucible placed in an electric furnace with a nitrogen atmosphere, about 23 g of a waste lithium-ion battery and 7.3 g of a flux mixture with the $SiO_2/CaO$ ratio of 1 were held at temperatures ranging from 1,450° C. to 1,500° C. for 30 minutes. After holding the temperature in this range, 20 L of oxygen was blown through an alumina tube to oxidize the sample. After the oxidation, the sample was held for 30 minutes in the furnace and cooled. After the cooling, the resulting slag and alloy were separated and recovered in the same way as in the example, and then subjected to analysis using the ICP method to determine the distribution ratios of metallic iron and metallic cobalt.

Figure 3:
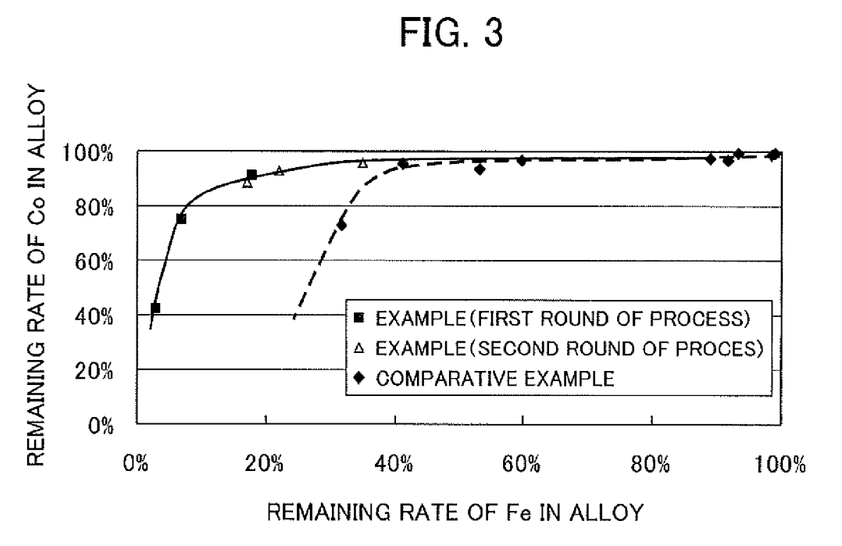
FIG. 3 is a graph showing the distribution ratios of metallic iron and metallic cobalt in an alloy in the first and second processes in an example of the invention.

Table 1 and FIG. 3 show the results of the analysis of the distribution ratios of metallic iron and metallic cobalt in the first round and second round of process in the example and in the comparative example.

TABLE 1

| | ELEMENT NAME | METAL DISTRIBUTION RATE | | | | |
|---|---|---|---|---|---|---|
| EXAMPLE (FIRST ROUND OF PROCESS) | Fe | 3% | 7% | 18% | 42% | 91% |
| | Co | 42% | 75% | 91% | 96% | 97% |
| EXAMPLE (SECOND ROUND OF PROCESS) | Fe | 17% | 22% | 35% | | |
| | Co | 88% | 92% | 95% | | |
| COMPARATIVE EXAMPLE | Fe | 32% | 41% | 53% | 60% | 89% |
| | Co | 73% | 96% | 94% | 97% | 97% |

Table 1 and FIG. 3 show that when the distribution ratio of iron in the alloy, namely, the ratio of the weight of metallic iron in the alloy to the total weight of iron (calculated as iron element), was at least 7% in the first round of process, a metallic cobalt recovery rate of at least 75% was obtained, and when the weight ratio of metallic iron was at least 18% in the first round of process, a metallic cobalt recovery rate of at least 90% was obtained, which indicates that the performance of the separation of cobalt from iron is significantly higher in the example than in the comparative example. It is also indicated that in the second round of process where the second slag was reused as the first flux, at least the same level of separation performance as in the first round of process was achieved at a lower melting temperature.

The invention claimed is:

1. A method for recovering a valuable metal from a waste battery containing aluminium and iron, comprising:
   a melting step comprising melting the waste battery to form a melt;
   a first oxidation step comprising subjecting the melt during the melting step or the waste battery before the melting step to a treatment at a degree of oxidation that allows the aluminium to be oxidized;
   a first slag separation step comprising separating first slag containing aluminium oxide from the melt so that a first alloy containing iron is obtained;
   a second oxidation step comprising subjecting the first alloy or a melt of the first alloy to a treatment at a degree of oxidation that allows the iron to be oxidized; and
   a second slag separation step comprising separating second slag containing iron oxide from a melt after the second oxidation step so that a second alloy containing cobalt is recovered.

2. The valuable metal recovery method according to claim 1, wherein a ratio of a weight of iron in the first alloy to a total weight of iron in the waste battery is from 30% to 100%.

3. The valuable metal recovery method according to claim 2, wherein
 a ratio of a weight of cobalt in the second alloy to a total weight of cobalt in the waste battery is at least 75%, and
 a ratio of a weight of iron in the second alloy to the total weight of iron in the waste battery is from 7% to 30%.

4. The valuable metal recovery method according to claim 1, wherein
 a ratio of a weight of cobalt in the second alloy to a total weight of cobalt in the waste battery is at least 75%, and
 a ratio of a weight of iron in the second alloy to a total weight of iron in the waste battery is from 7% to 30%.

5. The valuable metal recovery method according to claim 4, wherein the first oxidation step is a pre-oxidation step comprising roasting the waste battery to perform a pre-oxidation treatment before the melting step.

6. The valuable metal recovery method according to claim 4, wherein the waste battery is a lithium-ion battery.

7. The valuable metal recovery method according to claim 1, wherein the first oxidation step is a pre-oxidation step comprising roasting the waste battery to perform a pre-oxidation treatment before the melting step.

8. The valuable metal recovery method according to claim 7, wherein the pre-oxidation step is performed at 600° C. to 1,250° C.

9. The valuable metal recovery method according to claim 7, wherein the waste battery is a lithium-ion battery.

10. The valuable metal recovery method according to claim 1, wherein the second slag separation step is performed at 1,350° C. to 1,550° C.

11. The valuable metal recovery method according to claim 1, wherein
 the valuable metal recovery is performed a plurality of times, wherein
 a first round of the melting step comprises forming a melt by melting a mixture obtained by adding a first flux to the waste battery,
 the second oxidation step comprises treating a mixture obtained by adding a second flux to the first alloy or a melt of the mixture, and
 a second round and optional subsequent round of the melting step comprise adding, to the waste battery, the second slag as a flux instead of the first flux.

12. The valuable metal recovery method according to claim 11, wherein the second flux comprises silicon dioxide ($SiO_2$) and lime (CaO) and has a weight ratio of $SiO_2$ to CaO of 0.5 to 1.5.

13. The valuable metal recovery method according to claim 12, wherein
 after the second round or optional subsequent round of the melting step, the first slag separation step, the second oxidation step, and the second slag separation step are performed to form the second alloy,
 a ratio of a weight of cobalt in resulting second alloy to a total weight of cobalt in the waste battery is at least 75%, and
 a ratio of a weight of iron in the resulting second alloy to a total weight of iron in the waste battery is from 7% to 30%.

14. The valuable metal recovery method according to claim 13, wherein the first round of the melting step is performed at 1,450° C. to 1,650° C., and the second round and optional subsequent round of the melting step are performed at 1,350° C. to 1,500° C.

15. The valuable metal recovery method according to claim 11, wherein
 after the second round or optional subsequent round of the melting step, the first slag separation step, the second oxidation step, and the second slag separation step are performed to form the second alloy,
 a ratio of a weight of cobalt in resulting second alloy to a total weight of cobalt in the waste battery is at least 75%, and
 a ratio of a weight of iron in the resulting second alloy to total weight of iron in the waste battery is from 7% to 30%.

16. The valuable metal recovery method according to claim 15, wherein the waste battery is a lithium-ion battery.

17. The valuable metal recovery method according to claim 11, wherein the first round of the melting step is performed at 1,450° C. to 1,650° C., and the second round and optional subsequent round of the melting step are performed at 1,350° C. to 1,500° C.

18. The valuable metal recovery method according to claim 11, wherein at least part of the first flux and/or the second flux comprises slag produced in copper refining.

19. The valuable metal recovery method according to claim 11, wherein the waste battery is a lithium-ion battery.

20. The valuable metal recovery method according to claim 1, wherein the waste battery is a lithium-ion battery.

* * * * *